United States Patent
Gorey

(10) Patent No.: US 11,242,700 B2
(45) Date of Patent: Feb. 8, 2022

(54) TRUCK TAILGATE LOCKING SYSTEM

(71) Applicant: HONDA PATENTS & TECHNOLOGIES NORTH AMERICA, Torrance, CA (US)

(72) Inventor: Colin P. Gorey, Marysville, OH (US)

(73) Assignee: HONDA PATENTS & TECHNOLOGIES NORTH AMERICA, Torrance, CA (US)

( * ) Notice: Subject to any disclaimer, the term of this patent is extended or adjusted under 35 U.S.C. 154(b) by 1015 days.

(21) Appl. No.: 15/909,656

(22) Filed: Mar. 1, 2018

(65) Prior Publication Data

US 2019/0271181 A1    Sep. 5, 2019

(51) Int. Cl.
*E05B 83/00* (2014.01)
*E06B 3/50* (2006.01)
*E05B 85/18* (2014.01)
*B62D 33/027* (2006.01)

(52) U.S. Cl.
CPC .............. *E05B 83/00* (2013.01); *E05B 85/18* (2013.01); *E06B 3/50* (2013.01); *B62D 33/0273* (2013.01); *E05Y 2900/546* (2013.01)

(58) Field of Classification Search
CPC .......... E05B 81/16; E05B 81/25; E05B 79/22; E05B 79/08; E05B 79/12; E05B 83/00; E05B 85/18; E05B 85/06; Y10S 292/29; Y10S 292/30; B62D 33/037; B62D 33/0273; B62D 33/033; E06B 3/50
See application file for complete search history.

(56) References Cited

U.S. PATENT DOCUMENTS

| | | | | | |
|---|---|---|---|---|---|
| 5,174,619 | A | * | 12/1992 | Bender | E05B 83/16 292/336.3 |
| 5,295,374 | A | * | 3/1994 | Bender | E05B 83/16 292/201 |
| 5,642,636 | A | * | 7/1997 | Mitsui | E05B 17/0062 292/201 |
| 5,715,713 | A | * | 2/1998 | Aubry | E05B 81/06 292/201 |
| 5,852,943 | A | * | 12/1998 | Dutka | E05B 81/06 70/237 |

(Continued)

FOREIGN PATENT DOCUMENTS

| CN | 103774938 A | 5/2014 | |
|---|---|---|---|
| DE | 19626914 C1 * | 10/1997 | ............. E05B 77/28 |

(Continued)

OTHER PUBLICATIONS

"Smart Lock Combo Video Installation" https://www.youtube.com/watch?v=eAtnsug4Bx0, as accessed on Nov. 28, 2017.

*Primary Examiner* — Christine M Mills
*Assistant Examiner* — Yahya Sidky
(74) *Attorney, Agent, or Firm* — Arent Fox LLP

(57) ABSTRACT

A lock assembly for use in a vehicle lock, such as on a truck tailgate. The lock assembly includes a single key cylinder which can concurrently control the locked/unlocked state of one or more door handles, thus rendering multiple handles simultaneously locked or unlocked. Such a lock assembly may provide manual control of access to a pickup truck bed, independently of the vehicle battery, thereby permitting the driver access even if the vehicle battery is dead.

21 Claims, 7 Drawing Sheets

(56) References Cited

U.S. PATENT DOCUMENTS

| | | | | |
|---|---|---|---|---|
| 6,017,067 | A * | 1/2000 | Yoneyama | E05B 83/16 292/216 |
| 6,192,725 | B1 * | 2/2001 | Watson | E05B 85/18 292/336.3 |
| 6,371,538 | B1 * | 4/2002 | Inoue | E05B 77/30 292/201 |
| 6,431,618 | B1 * | 8/2002 | Choo | E05B 83/16 292/216 |
| 6,523,869 | B1 * | 2/2003 | Jensen | E05B 83/16 292/216 |
| 6,902,213 | B2 * | 6/2005 | Lee | E05B 81/06 292/216 |
| 7,093,876 | B2 * | 8/2006 | Romig | B60P 1/26 296/50 |
| 7,547,056 | B2 * | 6/2009 | Waldner | B62D 33/0273 16/231 |
| 7,971,460 | B2 * | 7/2011 | Zagoroff | E05B 15/004 70/208 |
| 8,532,873 | B1 * | 9/2013 | Bambenek | E05B 81/76 701/36 |
| 8,720,956 | B2 * | 5/2014 | Murray | E05B 79/20 292/48 |
| 8,903,605 | B2 | 12/2014 | Bambenek et al. | |

FOREIGN PATENT DOCUMENTS

| | | | | |
|---|---|---|---|---|
| DE | 10 2014 214 269 A1 | 2/2015 | | |
| GB | 2359854 A * | 9/2001 | | E05B 77/28 |
| KR | 20040036251 A * | 4/2004 | | |
| KR | 20040050962 A * | 6/2004 | | |
| KR | 20050079165 A * | 8/2005 | | |

\* cited by examiner

TRUCK TAILGATE LOCKING SYSTEM

BACKGROUND

The present disclosure is directed to a tailgate locking system, such as for use on a pickup truck bed. It is desirable to be able to lock the pickup truck bed, so that it may be used securely as a storage space, and to prevent theft of the tailgate itself. Tailgates also often have multiple door handles, optionally with different modes of operation. Thus it may be desirable to be able to lock multiple door handles; in addition, it may be preferable to the customer to not have to carry around several keys for a single vehicle, so it is desirable to coordinate the locks on multiple handles for use with a single key. In addition, although power locks may provide ease of use via automated operation, power systems rely on battery power, and may be inoperable if the vehicle battery is dead. Thus, manual locks may be preferable for more reliable operation.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In some embodiments, the present disclosure is directed to a lock assembly, comprising: a key cylinder having a locked and an unlocked configuration; a lock arm having a first end and a second end; a connecting arm coupling the key cylinder to the first end of the lock arm; a slider coupled to the second end of the lock arm; a mounting bracket coupled to the lock arm, the mounting bracket defining a slot having a length and configured to accommodate the slider such that the slider is movable along the length of the slot between a first position and a second position wherein, when the key cylinder is in the locked position, the lock arm moves the slider into the first position in the slot, and when the key cylinder is in the unlocked position, the lock arm moves the slider into the second position in the slot.

In some aspects, the lock assembly further comprises a door handle, and, when the key cylinder is in the locked position and the lock arm is in the first position in the slot, the slider interferes with operation of the door handle, and when the key cylinder is in the unlocked position and the lock arm is in the second position in the slot, the slider does not interfere with operation of the door handle.

In some aspects, the bracket further comprises a first mechanical stop tab attached thereto, wherein, the first mechanical stop tab is attached to the bracket at a location such that, when the key cylinder is in the locked position, the lock arm contacts the first mechanical stop tab, and the contacting of the lock arm with the first mechanical stop tab stops the slider from moving past the first position in the slot.

In some aspects, the bracket further comprises a second mechanical stop tab attached thereto, wherein, the second mechanical stop tab is attached to the bracket at a location such that, when the key cylinder is in the unlocked position, the lock arm contacts the second mechanical stop tab, and the contacting of the lock atm with the second mechanical stop tab stops the slider from moving past the second position in the slot.

In some aspects, the door handle is a first door handle, and the lock assembly further comprises a second door handle, wherein, when the key cylinder is in the locked position, the lock arm moves the slider into the first position in the slot where the slider interferes with the operation of the second door handle, and when the key cylinder is in the unlocked position, the lock arm moves the slider into the second position in the slot where the slider does not interfere with the operation of the second door handle.

In some aspects, the lock assembly further comprises a lock lever connected to the first door handle and the second door handle, wherein the lock lever moves between a first lock lever position and a second lock lever position when the first door handle or the second door handle is actuated, and wherein, when the key cylinder is in the locked position, the slider interferes with movement of the lock lever between the first lock lever position and the second lock lever position.

In some aspects, said movement of the lock lever is rotation of the lock lever.

In some aspects, when the key cylinder is in the unlocked position, operation of the first door handle enables opening of a door rotatably about a first axis, and operation of the second door handle enables opening of the door rotatably about a second axis different from the first axis.

In some aspects, the lock assembly further comprises a lock lever connected to the door handle, wherein the lock lever moves between a first lock lever position and a second lock lever position when the door handle is actuated, and wherein, when the key cylinder is in the locked position, the slider interferes with movement of the lock lever between the first lock lever position and the second lock lever position.

In some aspects, said movement of the lock lever is rotation of the lock lever.

In some aspects, the bracket further defines an opening coupled to the slot, and wherein the slider is removable through the opening.

In some embodiments, the present disclosure is directed to a tailgate assembly, comprising: a tailgate door, the tailgate door comprising a first door handle positioned on a surface of the tailgate door; a key cylinder having a locked and an unlocked configuration; a lock arm having a first end and a second end; a connecting atm coupling the key cylinder to the first end of the lock arm; a slider coupled to the second end of the lock arm; a lock lever connected to the first door handle, wherein the lock lever rotates between a first lock lever position and a second lock lever position when the first door handle is actuated; a mounting bracket coupled to the lock arm, the mounting bracket defining a slot having a length and configured to accommodate the slider such that the slider is movable along the length of the slot between a first position and a second position wherein, when the key cylinder is in the locked position, the lock arm moves the slider into the first position in the slot where the slider interferes with rotation of the lock lever between the first lock lever position and the second lock lever position, and interferes with the operation of the first door handle, and when the key cylinder is in the unlocked position, the lock arm moves the slider into the second position in the slot where the slider does not interfere with operation of the first door handle, and actuation of the first door handle enables opening of the tailgate door rotatably about a first axis, and wherein the bracket further comprises a first mechanical stop tab attached thereto, wherein, the first mechanical stop tab is attached to the bracket at a location such that, when the key cylinder is in the locked position, and the lock arm moves the slider into the first position in the slot, the lock arm contacts the first mechanical stop tab, and the contacting of the lock arm with the first mechanical stop tab stops the slider from moving past the first position in the slot. All aspects described with reference to the lock assembly apply to the tailgate assembly with equal force.

In some aspects, the bracket further comprises a second mechanical stop tab attached thereto, wherein, the second mechanical stop tab is attached to the bracket at a location such that, when the key cylinder is in the unlocked position, and the lock arm moves the slider into the second position in the slot, the lock arm contacts the second mechanical stop tab, and the contacting of the lock arm with the second mechanical stop tab stops the slider from moving past the second position in the slot.

In some aspects, the tailgate door further comprises a second door handle spaced apart from the first door handle on the surface of the tailgate door, and wherein, when the key cylinder is in the locked position, the lock arm moves the slider into the first position in the slot where the slider interferes with the operation of the first and second door handles, when the key cylinder is in the unlocked position, the lock arm moves the slider into the second position in the slot where the slider does not interfere with operation of the first and second door handles, and when the key cylinder is in the unlocked position, operation of the first door handle enables opening of the tailgate door rotatably about the first axis, and operation of the second door handle enables opening of the tailgate door rotatably about a second axis different from the first axis.

In some aspects, the lock lever rotates between the first lock lever position and the second lock lever position when the second door handle is actuated.

In some aspects, the bracket further defines an opening connected to the second position in the slot, and wherein the slider is removable through the opening.

In some aspects, the bracket further comprises a second mechanical stop tab attached thereto, wherein, the second mechanical stop tab is attached to the bracket at a location such that, when the key cylinder is in the unlocked position, and the lock arm moves the slider into the second position in the slot, the lock arm contacts the second mechanical stop tab, and the contacting of the lock arm with the second mechanical stop tab stops the slider from moving past the second position in the slot.

In some embodiments, the present disclosure is directed to a lock assembly for a vehicle tailgate, comprising: a first door handle for opening a tailgate door; a second door handle for opening the tailgate door; a synchronizer connected to a lock lever operable by the first door handle and the second door handle for opening the tailgate door; and a slider movable between a first position in which the slider interferes with movement of the lock lever to prevent opening the tailgate door, and a second position in which movement of the lock lever is operable to open the tailgate door.

In some aspects, the lock assembly further comprises a mounting bracket for attaching to the tailgate door, the mounting bracket defining a slot having a length and configured to accommodate the slider such that the slider is movable along the length of the slot between the first position and the second position.

In some aspects, the lock assembly further comprises a lock arm joined to the slider and the mounting bracket; and a key cylinder operably connected to the lock arm such that movement of the key cylinder moves the lock arm to move the slider between the first position and the second position.

In some aspects, the bracket further defines an opening connected to the second position in the slot, and wherein the slider is removable through the opening.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The present disclosure provides lock assemblies and tailgate assemblies comprising the same. Locking of a single key cylinder can serve to lock one or more handles concurrently, interfering with opening of a door by any associated door handle. Such lock assemblies may be particularly useful in automotive doors, especially tailgate doors, which may have multiple handles and modes of opening, e.g., a swing mode such as about a vertical axis, and a drop mode such as about a horizontal axis.

Figure 1A:
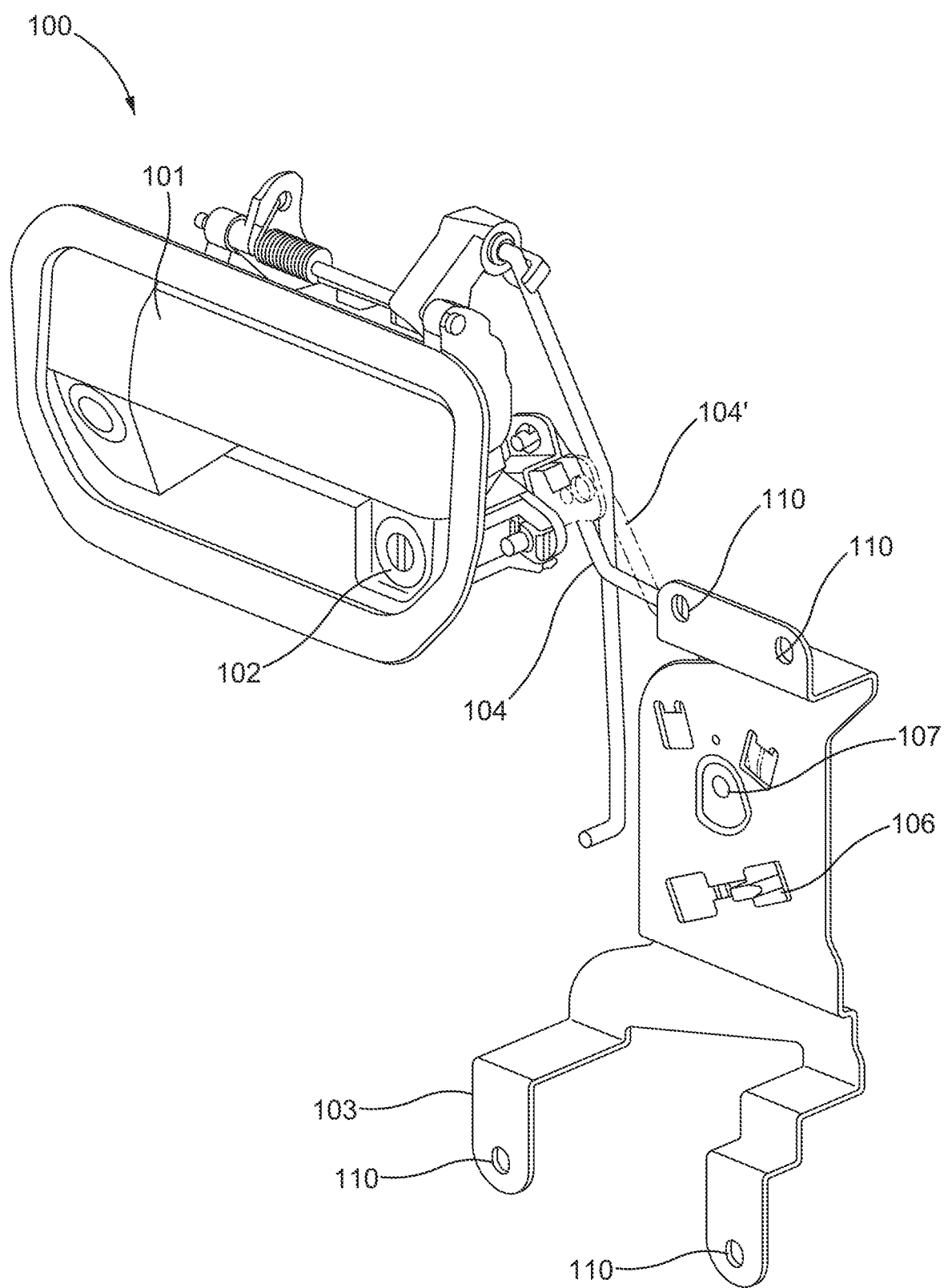
FIG. 1A depicts a lock assembly according to some aspects of the present disclosure.
Figure 1B:
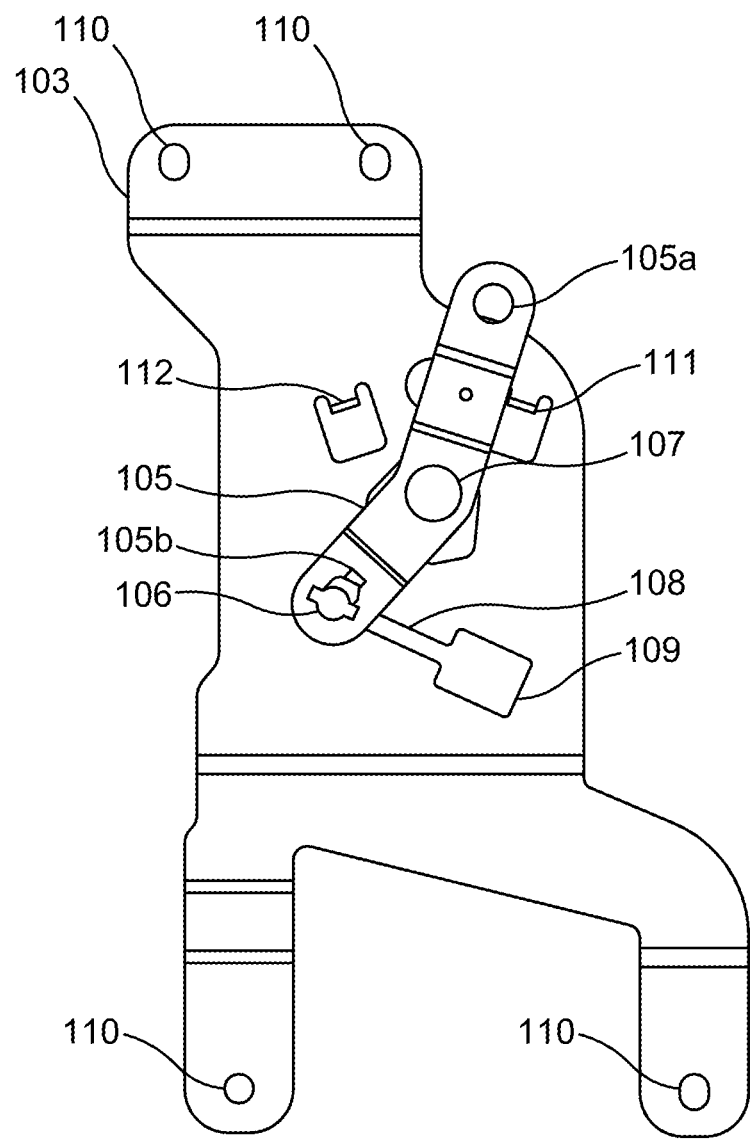
FIG. 1B depicts a rear view of a partial lock assembly according to some aspects of the present disclosure, in the locked state.
Figure 1C:
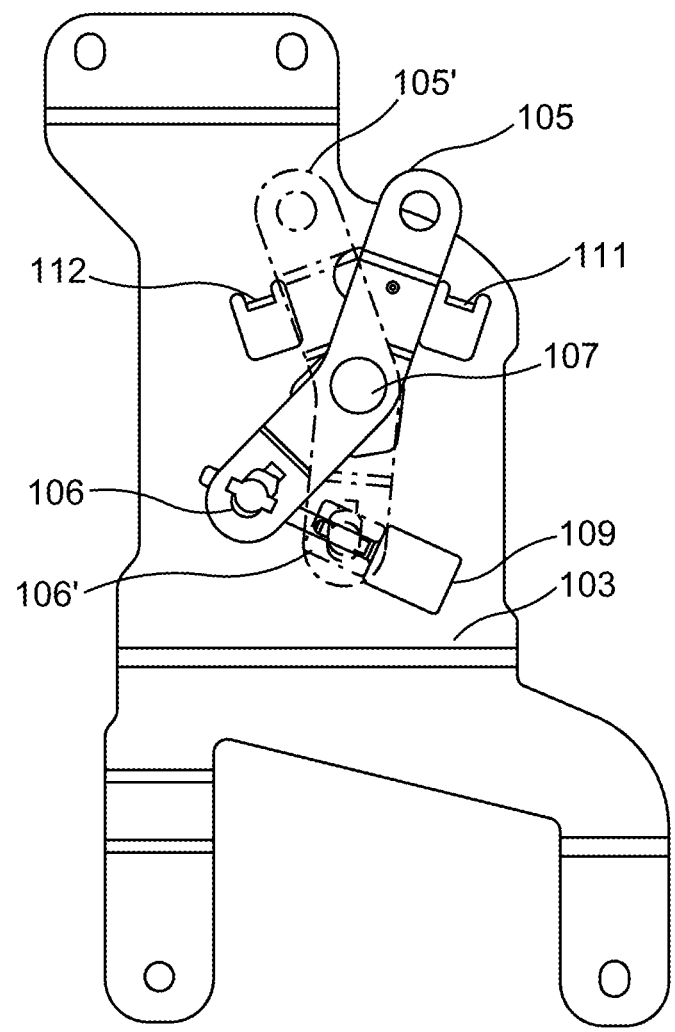
FIG. 1C depicts the view shown in FIG. 1B, showing both the locked and unlocked states.

FIGS. 1A-1C show a lock assembly 100 according to some aspects of the present disclosure. Lock assembly 100 contains door handle 101, key cylinder 102, and mounting bracket 103. Door handle 101 and key cylinder 102 are attached separately from mounting bracket 103 and are indirectly but operably connected to mounting bracket 103, as will be discussed further below. Lock assembly 100 may be mounted, via mounting bracket 103, to a surface, such as the surface of a door, such as an internal surface. Mounting bracket 103 may be affixed to the surface via one or more mounting holes 110, by any suitable means known to those of ordinary skill in the art, including but not limited to screws, nuts and bolts, or rivets.

Key cylinder 102 is connected, via connecting arm 104, to lock arm 105 at a first end 105a. A slider 106 is coupled to the lock arm 105 at a second end 105b. Lock arm 105 is rotatably coupled to mounting bracket 103, such as via a rivet 107. Mounting bracket 103 further contains a slot 108, having a length, and slot 108 is configured to accommodate slider 106 such that slider 106 is movable along the length of the slot 108 between a first position and a second position (see FIG. 1C). In some aspects, one of the first and second positions is located at a terminus of the slot. In some aspects, both the first and second positions are located at different termini of the slot. In some aspects, neither the first position nor the second position is located at a terminus of the slot.

In some aspects of the present disclosure, coupling or connection between two components may be direct couplings or connections, e.g., threading of slider 106 directly into slot 108. In some aspects, coupling or connection between two components may be indirect couplings or connections, via one or more intermediary connectors or couplers, e.g., coupling of lock arm 105 to mounting bracket 103 via rivet 107.

Slider 106 may be of any size and shape capable of coupling to slot 108. Slider 106 may be made from any number of materials such as plastics or metals, and may be manufactured by any suitable means known to those of ordinary skill in the art, such as by injection molding, casting, etc.

The first and second positions correspond to locked and unlocked configurations of key cylinder 102. For example, when the key cylinder 102 is in the locked position, the lock arm 105 moves the slider 106 into the first position in the slot (i.e., the position of 106 shown in FIGS. 1B and 1C); and when the key cylinder 102 is in the unlocked position, the lock arm 105' moves the slider 106' into the second position in the slot (i.e., the position of 106' shown in FIG. 1C). That is, when key cylinder 102 is in the locked configuration, the connecting arm has the configuration or position as shown for connecting arm 104, the lock arm has the configuration or position as shown for lock arm 105, and the slider has the configuration or position as shown for slider 106; but when key cylinder 102 is in the unlocked configuration, the connecting arm has the configuration or position as shown for connecting arm 104', the lock arm has the configuration or position as shown for lock arm 105', and the slider has the configuration or position as shown for slider 106'. Key cylinder 102 may be moved between locked and unlocked configurations using a key, such as a car key.

In the locked position, slider 106 interferes with operation of door handle 101; in the unlocked position, slider 106' does not interfere with operation of door handle 101. As used herein, "interfering with operation of a door handle" prevents opening of a door upon actuation of a door handle. That is, when slider 106 interferes with operation of door handle 101, actuation of door handle 101 does not result in opening of an associated door, because slider 106 interferes with lock lever 115 (see FIG. 1E); and when slider 106' does not interfere with operation of door handle 101, actuation of door handle 101 does not prevent opening of an associated door, because slider 106' does not interfere with lock lever 115 (see FIG. 1D).

Figure 1E:
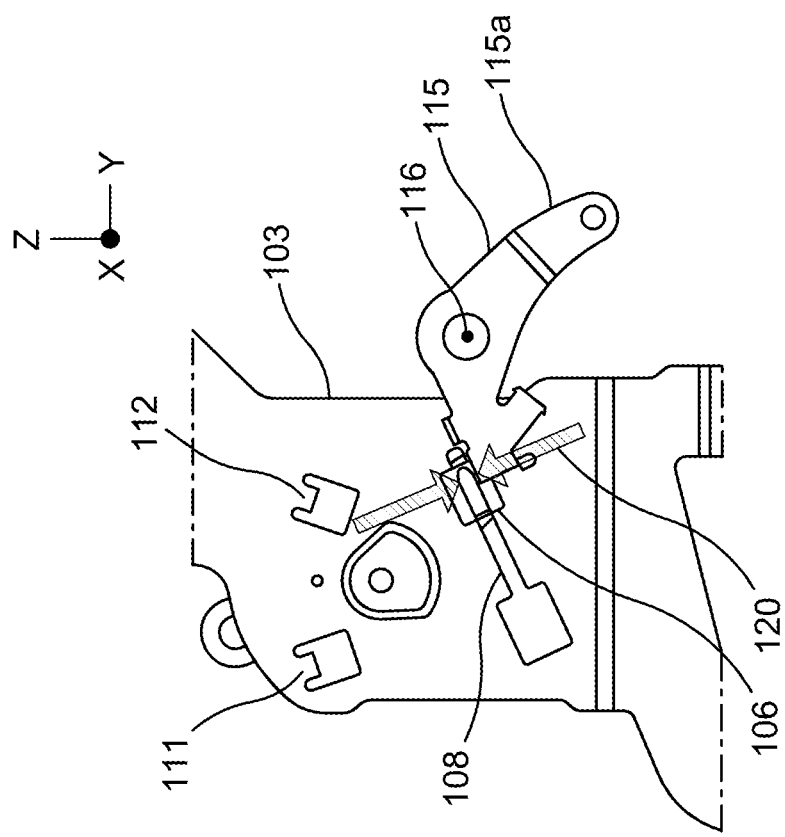
FIG. 1E shows a front view of a partial lock assembly according to some aspects of the present disclosure, in the locked state.
Figure 1D:
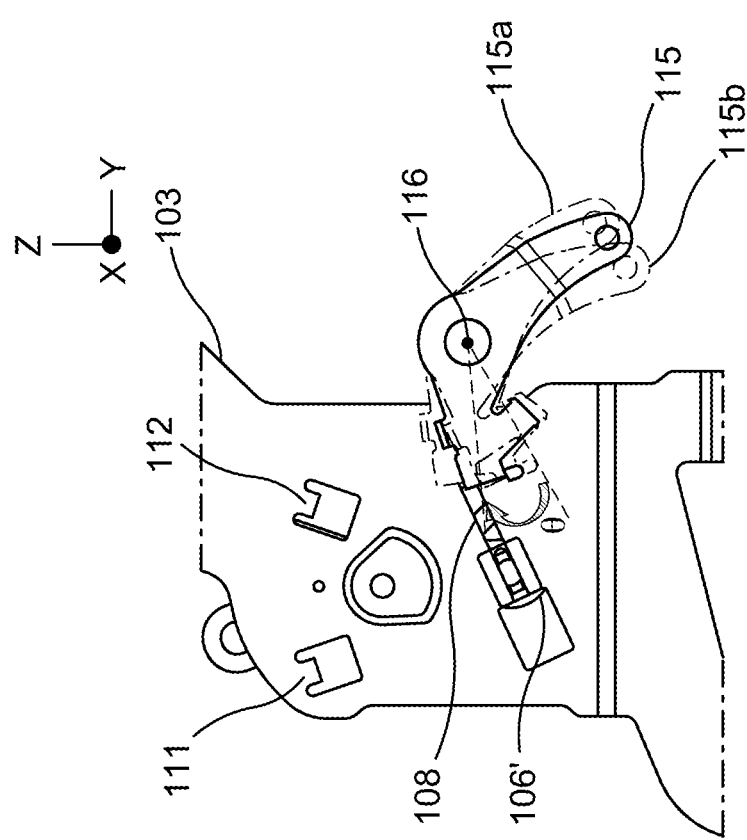
FIG. 1D shows a front view of a partial lock assembly according to some aspects of the present disclosure, in the unlocked state.

The lock lever 115, as shown in FIGS. 1D and 1E, is connected to door handle 101, and lock lever 115 is actuated by actuation of the door handle 101.

FIG. 1D shows the lock assembly in the unlocked configuration, with slider 106' at the second position in slot 108. In the unlocked configuration, slider 106' does not interfere with movement of lock lever 115 between first lock lever position 115a and second lock lever position 115b. Such movement of lock lever 115 may be rotation, such as about an axis 116. In some aspects, the movement of lock lever 115 between first lock lever position 115a and second lock lever position 115b is rotation or pivoting about axis 116 by an angle θ, which may be less than 360°.

FIG. 1E shows the lock assembly in the locked configuration, with slider 106 at the first position in slot 108. In the locked configuration, slider 106 interferes with movement of lock lever 115 between first lock lever position 115a and second lock lever position 115b (not shown). As used herein, "interfering with movement of the lock lever between the first lock lever position and the second lock lever position" means preventing, blocking, inhibiting, or limiting movement, partially or completely. In the aspect shown, in the locked configuration, slider 106 physically blocks rotation of lock lever 115 about axis 116, from first lock lever position 115a to second lock lever position 115b (not shown), at the position 120 indicated.

First lock lever position 115a may be correlated with a closed door, and second lock lever position 115b may be correlated with an open door. In some aspects, the lock lever moves between a first lock lever position and a second lock lever position when the door handle is actuated, and the door may be able to be opened; and when the key cylinder is in the locked position, the slider interferes with movement of the lock lever between the first lock lever position and the second lock lever position, and the door may not be able to be opened.

In some aspects, mounting bracket 103 further comprises a first mechanical stop tab 111 attached thereto. First mechanical stop tab 111 is attached to mounting bracket 103 at a location such that, when the key cylinder 102 goes from unlocked to locked, and the lock arm 105 moves the slider 106 into the first position in the slot 108, the lock arm 105 contacts the first mechanical stop tab 111. The contacting of lock arm 105 with first mechanical stop tab 111 stops the slider 106 from moving past the first position in slot 108. As used herein, "moving past" the first position refers to movement of the slider 106 in a direction away from the first position and even further away from the second position.

The first mechanical stop tab 111 may be composed of any suitable material, including but not limited to the same material as the mounting bracket 103. If the first mechanical stop tab 111 is composed of the same material as the mounting bracket 103, mounting bracket 103 may be manufactured with the first mechanical stop tab 111 already built-in. First mechanical stop tab 111 may be located anywhere on mounting bracket 103 suitable to stop movement of slider 106 past the first position by contacting lock arm 105; suitable locations can be determined by those of ordinary skill in the art. For example, first mechanical stop tab 111 may be located on mounting bracket 103 so as to make contact with the portion of lock arm 105 proximal to the first end 105a (as shown in FIGS. 1B and 1C) or so as to make contact with the portion of lock arm 105 proximal to second end 105b. Thus, first mechanical stop tab 111 may limit motion of the lock arm 105.

In some aspects, mounting bracket 103 may further comprise a second mechanical stop tab 112 attached thereto. Second mechanical stop tab 112 is attached to mounting bracket 103 at a location such that, when the key cylinder 102 goes from locked to unlocked, and the lock arm 105 moves the slider 106 into the second position in the slot 108, the lock arm 105' contacts the second mechanical stop tab 112. The location of the second mechanical stop tab 112 is preferably different from the location of the first mechanical stop tab 111. The contacting of lock arm 105' with second mechanical stop tab 112 stops the slider 106' from moving past the second position in slot 108. As used herein, "moving past" the second position refers to movement of the slider 106' in a direction away from the second position and even further away from the first position.

The second mechanical stop tab 112 may be composed of any suitable material(s), including but not limited to the same material(s) as the mounting bracket 103 and/or the same material(s) as first mechanical stop tab 111. If the second mechanical stop tab 112 is composed of the same material as the mounting bracket 103, mounting bracket 103 may be manufactured with the second mechanical stop tab 112 already built-in. Second mechanical stop tab 112 may be located anywhere on mounting bracket 103 suitable to stop movement of the slider past the second position (106') by contacting lock arm 105'; suitable locations can be determined by those of ordinary skill in the art. For example, second mechanical stop tab 112 may be located on mounting bracket 103 so as to make contact with the portion of lock arm 105' proximal to the first end 105*a* (as shown in FIGS. 1B and 1C) or so as to make contact with the portion of lock arm 105' proximal to second end 105*b*. Thus, second mechanical stop tab 112 may limit motion of the lock arm 105'.

In some aspects, mounting bracket 103 further defines an opening 109 coupled to slot 108, wherein slider 106 is removable through the opening 109. Opening 109 may be a hole that is larger than slot 108 in one or more dimensions, but may be of any size and shape such that slider 106 is removable through it, as may be desirable for repair, maintenance, and/or cleaning. Opening 109 may be at one or both ends of slot 108, past the first position (locked) and/or the second position (unlocked). Lock assembly 100 is preferably configured to keep slider 106 or 106' in slot 108 for normal operation (locking and unlocking), except for when repair, maintenance, and/or cleaning may be desirable.

Suitably, each component of lock assembly 100 may be made of any material(s) that do not interfere with the function of the respective component or assembly 100 as a whole, and include those known to persons of ordinary skill in the art. Suitable materials also include those which may protect components from corrosion, degradation, and/or wear and tear from use or operation of the lock assembly over time or from exposure to the environment, as will be known to those of ordinary skill in the art. For example, one or more of mounting bracket 103 and lock arm 105 may contain coatings, such as paints or hydrophobic coatings, to protect from corrosion.

Figure 2:
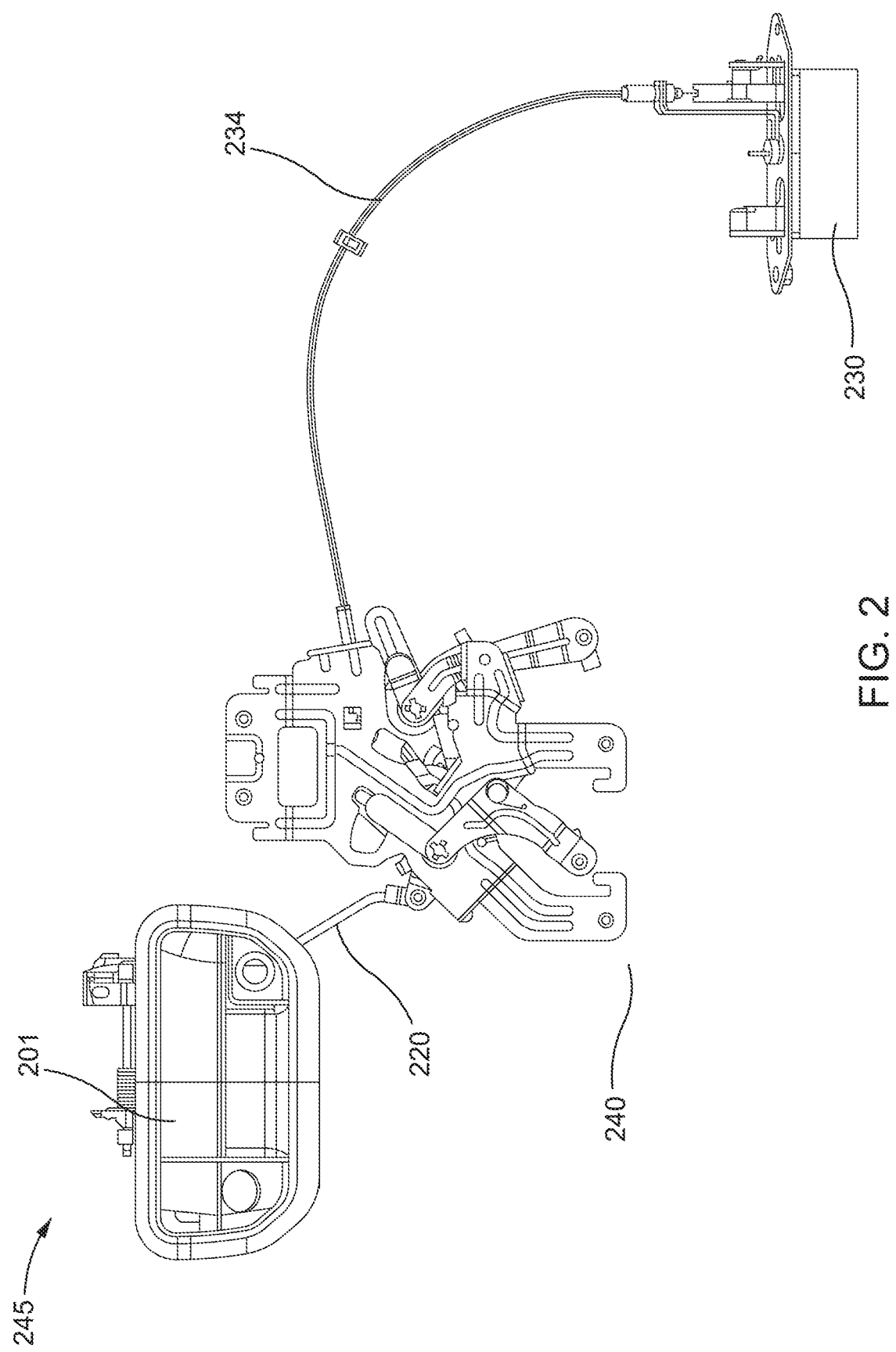
FIG. 2 shows a lock assembly with two door handles according to some aspects of the present disclosure.

In some aspects, the door handle is a first door handle, and the lock assembly further comprises a second door handle. FIG. 2 shows door handle assembly 245 comprising first door handle 201, connector 220, second door handle 230, and synchronizer 240. First door handle 201 may be similar in some aspects to door handle 101. Synchronizer 240 is a known set of structures that allow for the opening of a door via different handles. Synchronizers are known to those of ordinary skill in the art; exemplary synchronizers include those described in U.S. Pat. No. 8,720,956, which is incorporated herein by reference. Synchronizer 240 is connected to the door handle 201 by connector 220 and to second door handle 230 by cable 234. Mounting bracket 103, which is connected to lock arm 105, slider 106, and lock lever 115, is mounted over synchronizer 240, which is also connected to lock lever 115. Thus, the lock assembly 100 controls the locked and unlocked states of first door handle 201 and second door handle 230 via lock lever 115, which is connected to both lock assembly 100 and synchronizer 240.

When the key cylinder 102 is in the locked position, the lock arm 105 moves the slider 106 into the first position in the slot 108 where the slider 106 prevents opening of the door by the second door handle 230, by interfering with movement of lock lever 115, which is connected to tailgate synchronizer 240; when the key cylinder 102 is in the unlocked position, the lock arm 105' moves the slider 106 into the second position (106') in the slot 108 where the slider 106' does not interfere with opening of the door by the second door handle 230, because slider 106' does not interfere with movement of lock lever 115, which is connected to tailgate synchronizer 240. A single key cylinder 102 in the locked position concurrently interferes with operation of both the first door handle 201 and second door handle 230, and the single key cylinder 102 in the unlocked position concurrently does not interfere with operation of the first door handle 201 and second door handle 230; locking and unlocking of the first door handle 201 and second door handle 230 may be coordinated via a synchronizer 240. Mounting bracket 103 may be a plate, such as a metal plate, that is attached on top of the synchronizer 240, to facilitate coordination of the lock assembly 200 and the synchronizer 240. Suitable materials for mounting bracket 103 include, but are not limited to, stainless steel and other suitable metals and alloys known to those of skill in the art.

In some aspects, when the key cylinder 102 is in the unlocked position, operation of the first door handle 201 enables opening of a door rotatably about a first axis, and operation of the second door handle 230 enables opening of the door rotatably about a second axis different from the first axis. The first and second axes may be anywhere along the door, such as internally or along the edges. In some aspects, the first and second axes are along different edges of the door. Rotation about each axis may be by less than 360°, such as by as much as 90°, by as much as 180°, by as much as 270°, or any integer or subrange in between.

Figure 3A:
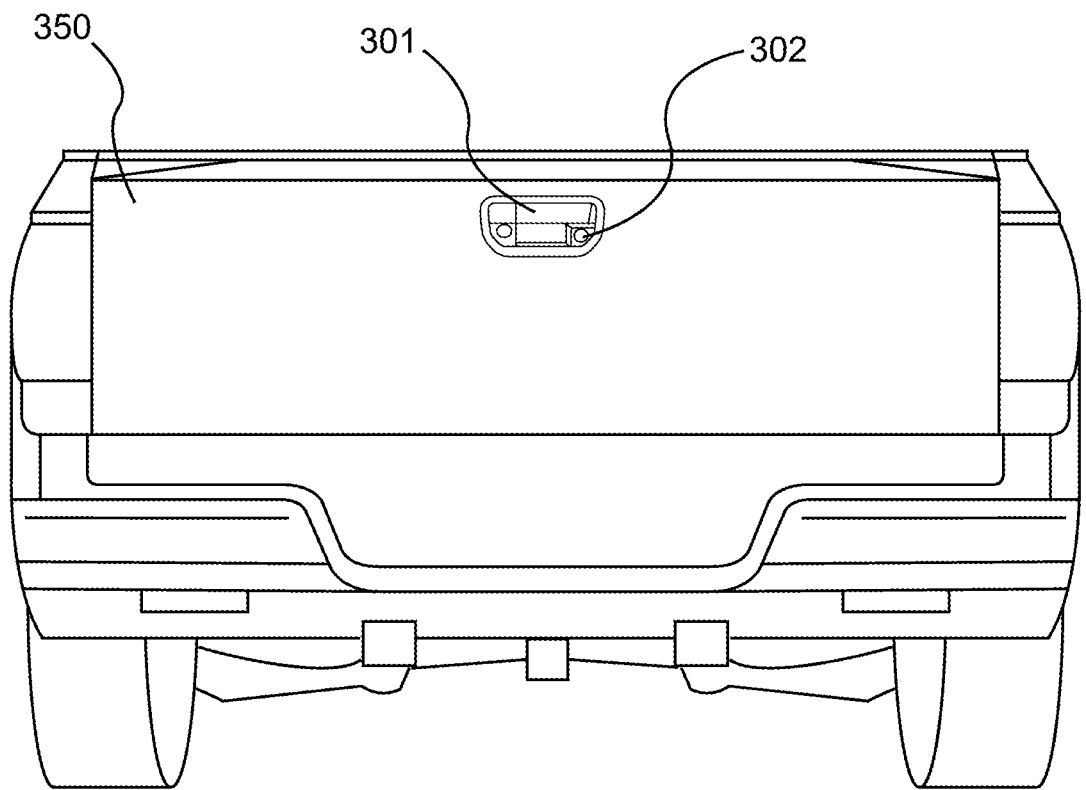
FIG. 3A shows a tailgate door with a first door handle and a key cylinder according to some aspects of the present disclosure.
Figure 3B:
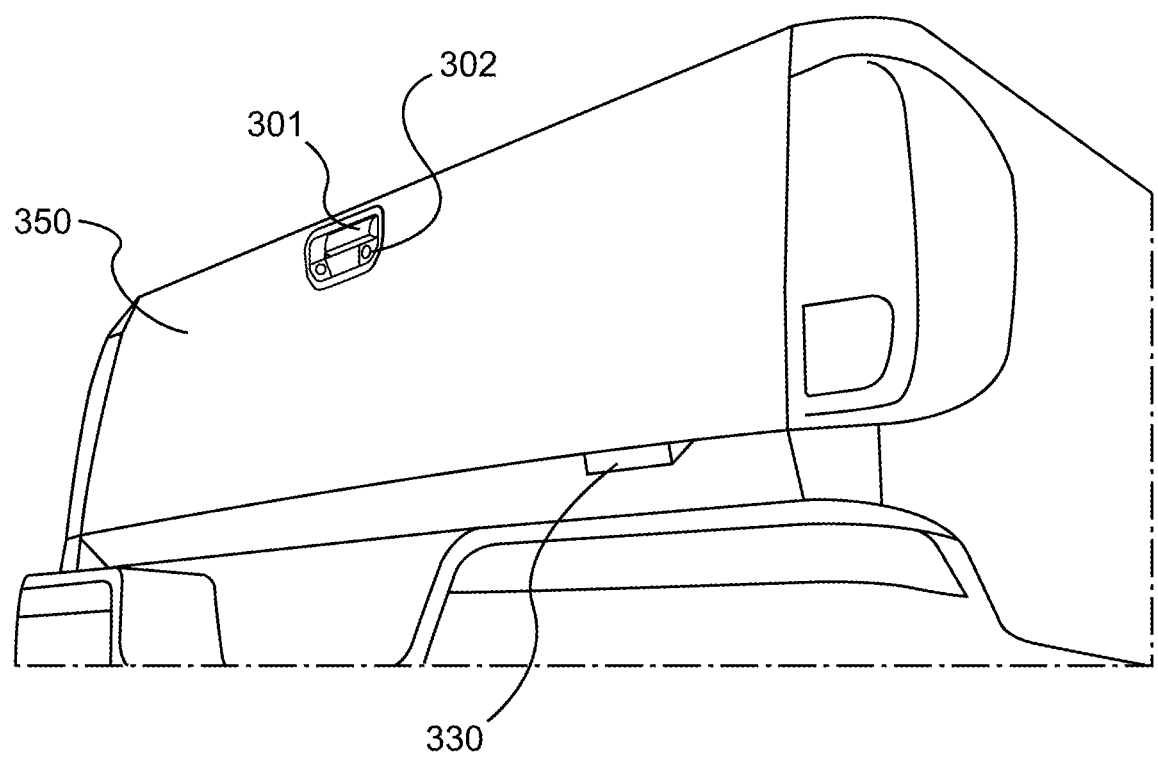
FIG. 3B shows a tailgate door with a key cylinder and first and second door handles according to some aspects of the present disclosure.

In some embodiments, the present disclosure is directed to a tailgate assembly, comprising a tailgate door comprising a first door handle and a key cylinder. In some aspects, the tailgate door further comprises a second door handle spaced apart from the first door handle. FIG. 3A shows a tailgate door 350, with a first door handle 301 and a key cylinder 302 positioned on an outer surface of tailgate door 350; and FIG. 3B shows a tailgate door 350 with a first door handle 301, a key cylinder 302, and a second door handle 330, all positioned on one or more outer surfaces of tailgate door 350, with second door handle 330 spaced apart from first door handle 301. As shown in FIG. 3B, the second door handle 330 can be within a recess on the underside of the outer surface of the tailgate door 350. First door handle 301 may be similar in some aspects to first door handles 101 and 201. Key cylinder 302 and second door handle 330 may be similar in some aspects to key cylinder 102 and second door handle 230, respectively. The embodiments and aspects described above (e.g., with reference to FIGS. 1A-1E and FIG. 2) can be incorporated into the tailgate door 350 shown in FIGS. 3A and 3B. All aspects described with reference to the lock assembly apply to the tailgate assembly with equal force, and vice versa. Some or all of the components or pieces described in each of FIGS. 1A-1E, 2, 3A, and 3B can be included in a kit for after-market installation on a vehicle, such as a pickup truck.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Moreover, all references throughout this application, for example patent documents including issued or granted patents or equivalents; patent application publications; and non-patent literature documents or other source material; are hereby incorporated by reference herein in their entireties, as though individually incorporated by reference.

What is claimed is:

1. A lock assembly, comprising:
   a key cylinder having a locked configuration and an unlocked configuration;
   a lock arm having a first end and a second end;
   a connecting arm coupling the key cylinder to the first end of the lock arm;
   a slider attached to the second end of the lock arm via an opening in the lock arm; and
   a mounting bracket coupled to the lock arm, the mounting bracket defining a slot having a length and configured to accommodate the slider such that the slider is movable along the length of the slot between a first position and a second position,
   wherein:
      when the key cylinder is moved into the locked configuration, the lock arm moves the slider into the first position in the slot,
      when the key cylinder is moved into the unlocked configuration, the lock arm moves the slider into the second position in the slot, and
      a portion of the slider passes through the opening on the lock arm and is configured to be engaged with the lock arm.

2. The lock assembly of claim 1, further comprising a door handle, and wherein:
   when the key cylinder is in the locked configuration and the slider is in the first position in the slot, the slider interferes with operation of the door handle, and
   when the key cylinder is in the unlocked configuration and the slider is in the second position in the slot, the slider does not interfere with operation of the door handle.

3. The lock assembly of claim 1, wherein:
   the mounting bracket further comprises a first mechanical stop tab attached thereto,
   the first mechanical stop tab is attached to the mounting bracket at a location such that, when the key cylinder is in the locked configuration, the lock arm contacts the first mechanical stop tab, and
   when the lock arm contacts the first mechanical stop tab, the slider is stopped from moving past the first position in the slot.

4. The lock assembly of claim 3, wherein:
   the mounting bracket further comprises a second mechanical stop tab attached thereto,
   the second mechanical stop tab is attached to the mounting bracket at a location such that, when the key cylinder is in the unlocked configuration, the lock arm contacts the second mechanical stop tab, and
   when the lock arm contacts the second mechanical stop tab, the slider is stopped from moving past the second position in the slot.

5. The lock assembly of claim 2, wherein the door handle is a first door handle, and the lock assembly further comprises a second door handle,
   wherein:
      when the key cylinder is moved into the locked configuration, the lock arm moves the slider into the first position in the slot where the slider interferes with the operation of the second door handle, and
      when the key cylinder is moved into the unlocked configuration, the lock arm moves the slider into the second position in the slot where the slider does not interfere with the operation of the second door handle.

6. The lock assembly of claim 5, further comprising a lock lever connected to the first door handle and the second door handle, wherein:
the lock lever moves between a first lock lever position and a second lock lever position when the first door handle or the second door handle is actuated, and
when the key cylinder is in the locked configuration, the slider interferes with movement of the lock lever between the first lock lever position and the second lock lever position.

7. The lock assembly of claim 6, wherein said movement of the lock lever is rotation of the lock lever.

8. The lock assembly of claim 5, wherein when the key cylinder is in the unlocked configuration, operation of the first door handle enables opening of a door rotatably about a first axis, and operation of the second door handle enables opening of the door rotatably about a second axis different from the first axis.

9. The lock assembly of claim 2, further comprising a lock lever connected to the door handle, wherein:
the lock lever moves between a first lock lever position and a second lock lever position when the door handle is actuated, and
when the key cylinder is in the locked configuration, the slider interferes with movement of the lock lever between the first lock lever position and the second lock lever position.

10. The lock assembly of claim 9, wherein said movement of the lock lever is rotation of the lock lever.

11. The lock assembly of claim 2, wherein the mounting bracket further defines an opening coupled to the slot, and wherein the slider is removable through the opening.

12. A tailgate assembly, comprising:
a tailgate door, the tailgate door comprising a first door handle positioned on a surface of the tailgate door;
a key cylinder having a locked configuration and an unlocked configuration;
a lock arm having a first end and a second end;
a connecting arm coupling the key cylinder to the first end of the lock arm;
a slider attached to the second end of the lock arm via an opening in the lock arm;
a lock lever connected to the first door handle, wherein the lock lever rotates between a first lock lever position and a second lock lever position when the first door handle is actuated; and
a mounting bracket coupled to the lock arm, the mounting bracket defining a slot having a length and configured to accommodate the slider such that the slider is movable along the length of the slot between a first position and a second position,
wherein:
when the key cylinder is moved into the locked configuration, the lock arm moves the slider into the first position in the slot where the slider interferes with rotation of the lock lever between the first lock lever position and the second lock lever position, and interferes with operation of the first door handle,
when the key cylinder is moved into the unlocked configuration, the lock arm moves the slider into the second position in the slot where the slider does not interfere with operation of the first door handle, and actuation of the first door handle enables opening of the tailgate door rotatably about a first axis,
a portion of the slider passes through the opening on the lock arm and is configured to be engaged with the lock arm,
the mounting bracket further comprises a first mechanical stop tab attached thereto,
the first mechanical stop tab is attached to the mounting bracket at a location such that, when the key cylinder is in the locked configuration, the slider is in the first position in the slot, and the lock arm contacts the first mechanical stop tab, and
when the lock arm contacts the first mechanical stop tab, the slider is stopped from moving past the first position in the slot.

13. The tailgate assembly of claim 12, wherein the mounting bracket further comprises a second mechanical stop tab attached thereto, wherein:
the second mechanical stop tab is attached to the mounting bracket at a location such that, when the key cylinder is in the unlocked configuration, the slider is in the second position in the slot, and the lock arm contacts the second mechanical stop tab, and
when the lock arm contacts the second mechanical stop tab, the slider is stopped from moving past the second position in the slot.

14. The tailgate assembly of claim 12, wherein:
the tailgate door further comprises a second door handle spaced apart from the first door handle on the surface of the tailgate door,
when the key cylinder is moved into the locked configuration, the lock arm moves the slider into the first position in the slot where the slider interferes with the operation of the first door handle and the second door handle,
when the key cylinder is moved into the unlocked configuration, the lock arm moves the slider into the second position in the slot where the slider does not interfere with operation of the first door handle and the second door handle, and
when the key cylinder is in the unlocked configuration, operation of the first door handle enables opening of the tailgate door rotatably about the first axis, and operation of the second door handle enables opening of the tailgate door rotatably about a second axis different from the first axis.

15. The tailgate assembly of claim 14, wherein:
the lock lever rotates between the first lock lever position and the second lock lever position when the second door handle is actuated, and
when the key cylinder is moved into the locked configuration, the lock arm moves the slider into the first position in the slot, where the slider interferes with rotation of the lock lever between the first lock lever position and the second lock lever position.

16. The tailgate assembly of claim 14, wherein the mounting bracket further defines an opening connected to the second position in the slot, and wherein the slider is removable through the opening.

17. The tailgate assembly of claim 14, wherein:
the mounting bracket further comprises a second mechanical stop tab attached thereto,
the second mechanical stop tab is attached to the mounting bracket at a location such that, when the key cylinder is moved into the unlocked configuration, the slider is moved into the second position in the slot, and the lock arm contacts the second mechanical stop tab, and when the lock arm contacts the second mechanical stop tab, the slider is stopped from moving past the second position in the slot.

18. The tailgate assembly of claim 12, wherein the mounting bracket further defines an opening connected to the second position in the slot, and wherein the slider is removable through the opening.

19. A lock assembly for a vehicle tailgate, comprising:
a first door handle for opening a tailgate door;
a second door handle for opening the tailgate door;
a synchronizer connected to a lock lever operable by the first door handle and the second door handle for opening the tailgate door;
a lock arm having a first end and a second end; and
a slider attached to the second end of the lock arm via an opening in the lock arm and movable between a first position in which the slider interferes with movement of the lock lever to prevent opening the tailgate door, and a second position in which movement of the lock lever is operable to open the tailgate door,
wherein a portion of the slider passes through the opening on the lock arm and is configured to be engaged with the lock arm.

20. The lock assembly of claim 19, further comprising a mounting bracket for attaching to the tailgate door, the mounting bracket defining a slot having a length and configured to accommodate the slider such that the slider is movable along the length of the slot between the first position and the second position.

21. The lock assembly of claim 19, further comprising:
a key cylinder operably connected to the lock arm such that movement of the key cylinder moves the lock arm to move the slider between the first position and the second position.

\* \* \* \* \*